United States Patent
Das et al.

(10) Patent No.: US 10,180,696 B2
(45) Date of Patent: Jan. 15, 2019

(54) DISTRIBUTED IMPEDANCE INJECTION MODULE FOR MITIGATION OF THE FERRANTI EFFECT

(71) Applicant: Smart Wires Inc., San Francisco, CA (US)

(72) Inventors: Debrup Das, Union City, CA (US); Haroon Inam, San Jose, CA (US)

(73) Assignee: Smart Wires Inc., Union City, CA (US)

( * ) Notice: Subject to any disclaimer, the term of this patent is extended or adjusted under 35 U.S.C. 154(b) by 0 days.

(21) Appl. No.: 15/345,065

(22) Filed: Nov. 7, 2016

(65) Prior Publication Data

US 2017/0160762 A1    Jun. 8, 2017

Related U.S. Application Data

(63) Continuation-in-part of application No. 15/069,785, filed on Mar. 14, 2016, and a continuation-in-part of application No. 15/055,422, filed on Feb. 26, 2016.
(Continued)

(51) Int. Cl.
*G05F 3/04* (2006.01)
*H02J 3/12* (2006.01)
(Continued)

(52) U.S. Cl.
CPC ............... *G05F 3/04* (2013.01); *H01F 27/06* (2013.01); *H02J 3/12* (2013.01); *H02J 3/1807* (2013.01); *H02J 3/20* (2013.01); *Y02E 40/30* (2013.01)

(58) Field of Classification Search
CPC .......... H02H 9/02; H03H 11/32; G01R 15/18; G01R 19/0092; G01R 21/08; G01R 5/186;
(Continued)

(56) References Cited

U.S. PATENT DOCUMENTS 2,237,812 A   4/1941 De Blieux
2,551,841 A   5/1951 Kepple et al.
(Continued)

FOREIGN PATENT DOCUMENTS

CH    660094       3/1987
CN    103256337    8/2013
(Continued)

OTHER PUBLICATIONS

"Office Action dated Nov. 3, 2017; U.S. Appl. No. 15/157,726", Nov. 3, 2017.
(Continued)

*Primary Examiner* — Kyle J Moody
(74) *Attorney, Agent, or Firm* — Womble Bond Dickinson (US) LLP (57) ABSTRACT

Disclosed is a method for reducing the variation in voltage, due to Ferranti effect, using the impedance injection capability of distributed impedance injection modules. The Ferranti effect is an increase in voltage occurring at the receiving end of a long transmission line in comparison to the voltage at the sending end. This effect is more pronounced on longer lies and underground lines when the high-voltage power lines are energized with a very low load, when there is a change from a high load to a very light load, or the load is disconnected from the high-voltage power lines of the power grid. This effect creates a problem for voltage control at the distribution end of the power grid.

13 Claims, 9 Drawing Sheets

Related U.S. Application Data (60) Provisional application No. 62/359,885, filed on Jul. 8, 2016, provisional application No. 62/264,744, filed on Dec. 8, 2015, provisional application No. 62/264,739, filed on Dec. 8, 2015.

(51) Int. Cl.
*H01F 27/06* (2006.01)
*H02J 3/18* (2006.01)
*H02J 3/20* (2006.01)

(58) Field of Classification Search
CPC .......... H02J 3/26; H02J 3/12; H02J 33/18087; H02J 3/20; G05F 3/04
See application file for complete search history.

(56) References Cited

U.S. PATENT DOCUMENTS

| | | | |
|---|---|---|---|
| 3,556,310 A | 1/1971 | Loukotsky | |
| 3,704,001 A | 11/1972 | Sloop | |
| 3,750,992 A | 8/1973 | Johnson | |
| 3,913,003 A | 10/1975 | Felkel | |
| 4,025,824 A | 5/1977 | Cheatham | |
| 4,057,736 A | 11/1977 | Jeppson | |
| 4,103,853 A | 8/1978 | Bannan | |
| 4,164,345 A | 8/1979 | Arnold et al. | |
| 4,200,899 A | 4/1980 | Volman et al. | |
| 4,277,639 A | 7/1981 | Olsson | |
| 4,286,207 A | 8/1981 | Spreadbury et al. | |
| 4,323,722 A | 4/1982 | Winkelman | |
| 4,367,512 A | 1/1983 | Fujita | |
| 4,514,950 A | 5/1985 | Goodson, Jr. | |
| 4,562,360 A | 12/1985 | Fujimoto | |
| 4,577,826 A | 3/1986 | Bergstrom et al. | |
| 4,710,850 A | 12/1987 | Jahn et al. | |
| 4,821,138 A | 4/1989 | Nakano et al. | |
| 4,903,927 A | 2/1990 | Farmer | |
| 5,006,846 A | 4/1991 | Granville et al. | |
| 5,023,768 A | 6/1991 | Collier | |
| 5,032,738 A | 7/1991 | Vithayathil | |
| 5,193,774 A | 3/1993 | Rogers | |
| 5,461,300 A | 10/1995 | Kappenman | |
| 5,469,044 A | 11/1995 | Gyugyi et al. | |
| 5,610,501 A | 3/1997 | Nelson et al. | |
| 5,648,888 A | 7/1997 | Le Francois et al. | |
| 5,844,462 A | 12/1998 | Rapoport et al. | |
| 5,884,886 A | 3/1999 | Hageli | |
| 5,886,888 A | 3/1999 | Akamatsu et al. | |
| 5,986,617 A | 11/1999 | McLellan | |
| 6,088,249 A | 7/2000 | Adamson | |
| 6,134,105 A | 10/2000 | Lueker | |
| 6,147,581 A | 11/2000 | Rancourt et al. | |
| 6,215,653 B1 | 4/2001 | Cochran et al. | |
| 6,233,137 B1 | 5/2001 | Kolos et al. | |
| 6,335,613 B1 | 1/2002 | Sen et al. | |
| 6,486,569 B2 | 11/2002 | Couture | |
| 6,727,604 B2 | 4/2004 | Couture | |
| 6,831,377 B2 | 12/2004 | Yampolsky et al. | |
| 6,895,373 B2 | 5/2005 | Garcia et al. | |
| 6,914,195 B2 | 7/2005 | Archambault et al. | |
| 7,090,176 B2 | 8/2006 | Chavot et al. | |
| 7,091,703 B2 | 8/2006 | Folts et al. | |
| 7,105,952 B2 | 9/2006 | Divan et al. | |
| 7,193,338 B2 | 3/2007 | Ghali | |
| 7,352,564 B2 | 4/2008 | Courtney | |
| 7,460,931 B2 | 12/2008 | Jacobson | |
| 7,642,757 B2 | 1/2010 | Yoon et al. | |
| 7,688,043 B2 | 3/2010 | Toki et al. | |
| 7,834,736 B1 | 11/2010 | Johnson et al. | |
| 7,835,128 B2 | 11/2010 | Divan et al. | |
| 7,932,621 B1 | 4/2011 | Spellman | |
| 8,019,484 B2 | 9/2011 | Korba et al. | |
| 8,249,836 B2 | 8/2012 | Yoon et al. | |
| 8,270,558 B2 | 9/2012 | Dielissen | |
| 8,310,099 B2 | 11/2012 | Engel et al. | |
| 8,401,709 B2 | 3/2013 | Cherian et al. | |
| 8,441,778 B1 | 5/2013 | Ashmore | |
| 8,497,592 B1 | 7/2013 | Jones | |
| 8,680,720 B2 | 3/2014 | Schauder et al. | |
| 8,681,479 B2 | 3/2014 | Englert et al. | |
| 8,816,527 B1 | 8/2014 | Ramsay et al. | |
| 8,825,218 B2 | 9/2014 | Cherian et al. | |
| 8,867,244 B2 | 10/2014 | Trainer et al. | |
| 8,872,366 B2 | 10/2014 | Campion et al. | |
| 8,890,373 B2 * | 11/2014 | Savolainen | H02J 3/00 307/151 |
| 8,896,988 B2 | 11/2014 | Subbaiahthever et al. | |
| 8,922,038 B2 | 12/2014 | Bywaters et al. | |
| 8,957,752 B2 | 2/2015 | Sharma et al. | |
| 8,996,183 B2 | 3/2015 | Forbes, Jr. | |
| 9,099,893 B2 | 8/2015 | Schmiegel et al. | |
| 9,124,100 B2 | 9/2015 | Ukai et al. | |
| 9,124,138 B2 | 9/2015 | Mori et al. | |
| 9,130,458 B2 | 9/2015 | Crookes et al. | |
| 9,172,246 B2 * | 10/2015 | Ramsay | H02J 3/26 |
| 9,178,456 B2 | 11/2015 | Smith et al. | |
| 9,185,000 B2 | 11/2015 | Mabilleau et al. | |
| 9,207,698 B2 | 12/2015 | Forbes, Jr. | |
| 9,217,762 B2 | 12/2015 | Kreikebaum et al. | |
| 9,246,325 B2 | 1/2016 | Coca Figuerola et al. | |
| 9,325,173 B2 | 4/2016 | Varma et al. | |
| 9,331,482 B2 | 5/2016 | Huang | |
| 9,659,114 B2 | 5/2017 | He et al. | |
| 9,843,176 B2 * | 12/2017 | Gibson | H02G 1/02 |
| 2002/0005668 A1 | 1/2002 | Couture | |
| 2002/0042696 A1 | 4/2002 | Garcia et al. | |
| 2003/0006652 A1 | 1/2003 | Couture | |
| 2003/0098768 A1 | 5/2003 | Hoffmann et al. | |
| 2004/0217836 A1 | 11/2004 | Archambault et al. | |
| 2005/0052801 A1 | 3/2005 | Ghali | |
| 2005/0073200 A1 | 4/2005 | Divan et al. | |
| 2005/0194944 A1 | 9/2005 | Folts et al. | |
| 2005/0205726 A1 | 9/2005 | Chavot et al. | |
| 2006/0085097 A1 | 4/2006 | Courtney | |
| 2007/0135972 A1 | 6/2007 | Jacobson | |
| 2007/0250217 A1 | 10/2007 | Yoon et al. | |
| 2008/0103737 A1 | 5/2008 | Yoon et al. | |
| 2008/0157728 A1 | 7/2008 | Toki et al. | |
| 2008/0177425 A1 | 7/2008 | Korba et al. | |
| 2008/0278976 A1 | 11/2008 | Schneider et al. | |
| 2008/0310069 A1 | 12/2008 | Divan et al. | |
| 2009/0243876 A1 | 10/2009 | Lilien et al. | |
| 2009/0281679 A1 | 11/2009 | Taft et al. | |
| 2010/0026275 A1 | 2/2010 | Walton | |
| 2010/0177450 A1 | 7/2010 | Holcomb et al. | |
| 2010/0213765 A1 | 8/2010 | Engel et al. | |
| 2010/0302744 A1 | 12/2010 | Englert et al. | |
| 2011/0060474 A1 | 3/2011 | Schmiegel et al. | |
| 2011/0095162 A1 | 4/2011 | Parduhn et al. | |
| 2011/0106321 A1 | 5/2011 | Cherian et al. | |
| 2011/0172837 A1 | 7/2011 | Forbes, Jr. | |
| 2012/0105023 A1 | 5/2012 | Schauder et al. | |
| 2012/0146335 A1 | 6/2012 | Bywaters et al. | |
| 2012/0205981 A1 | 8/2012 | Varma et al. | |
| 2012/0242150 A1 | 9/2012 | Ukai et al. | |
| 2012/0255920 A1 | 10/2012 | Shaw et al. | |
| 2012/0293920 A1 | 11/2012 | Subbaiahthever et al. | |
| 2013/0002032 A1 | 1/2013 | Mori et al. | |
| 2013/0033103 A1 | 2/2013 | McJunkin et al. | |
| 2013/0044407 A1 | 2/2013 | Byeon et al. | |
| 2013/0094264 A1 | 4/2013 | Crookes et al. | |
| 2013/0128636 A1 | 5/2013 | Trainer et al. | |
| 2013/0166085 A1 | 6/2013 | Cherian et al. | |
| 2013/0169044 A1 | 7/2013 | Stinessen et al. | |
| 2013/0182355 A1 | 7/2013 | Coca Figuerola et al. | |
| 2013/0184894 A1 | 7/2013 | Sakuma et al. | |
| 2013/0200617 A1 | 8/2013 | Smith et al. | |
| 2013/0277082 A1 | 10/2013 | Hyde et al. | |
| 2013/0345888 A1 | 12/2013 | Forbes, Jr. | |
| 2014/0025217 A1 | 1/2014 | Jin et al. | |
| 2014/0032000 A1 | 1/2014 | Chandrashekhara et al. | |
| 2014/0011297 A1 | 4/2014 | Earhart et al. | |
| 2014/0129195 A1 | 5/2014 | He et al. | |

(56) References Cited

U.S. PATENT DOCUMENTS

| | | |
|---|---|---|
| 2014/0132229 A1 | 5/2014 | Huang |
| 2014/0153383 A1 | 6/2014 | Mabilleau et al. |
| 2014/0188689 A1 | 7/2014 | Kalsi et al. |
| 2014/0203640 A1 | 7/2014 | Stinessen |
| 2014/0210213 A1 | 7/2014 | Campion et al. |
| 2014/0246914 A1 | 9/2014 | Chopra et al. |
| 2014/0247554 A1 | 9/2014 | Sharma et al. |
| 2014/0268458 A1 | 9/2014 | Luciani et al. |
| 2014/0312859 A1 | 10/2014 | Ramsay et al. |
| 2014/0327305 A1 | 11/2014 | Ramsay et al. |
| 2014/0347158 A1 | 11/2014 | Goeke et al. |
| 2015/0012146 A1 | 1/2015 | Cherian et al. |
| 2015/0029764 A1 | 1/2015 | Peng |
| 2015/0051744 A1 | 2/2015 | Mitra |
| 2015/0184415 A1 | 7/2015 | Bushore |
| 2015/0226772 A1 | 8/2015 | Kreikebaum et al. |
| 2015/0244307 A1 | 8/2015 | Cameron |
| 2015/0270689 A1 | 9/2015 | Gibson et al. |
| 2016/0036231 A1 | 2/2016 | Ramsay et al. |
| 2016/0036341 A1 | 2/2016 | Jang et al. |
| 2017/0163036 A1 | 6/2017 | Munguia et al. |
| 2017/0169928 A1 | 6/2017 | Carrow et al. |

FOREIGN PATENT DOCUMENTS

| | | |
|---|---|---|
| CN | 203668968 | 6/2014 |
| JP | 2002-199563 | 7/2002 |
| JP | 2005-045888 | 2/2005 |
| JP | 2015-086692 | 5/2015 |
| KR | 10-1053514 | 8/2011 |
| WO | WO-2008/082820 | 7/2008 |
| WO | WO-2014/035881 | 3/2014 |
| WO | WO-2014/074956 | 5/2014 |
| WO | WO-2014/099876 | 6/2014 |
| WO | WO-2015/074538 | 5/2015 |
| WO | WO-2015/119789 | 8/2015 |

OTHER PUBLICATIONS

"Office Action dated Jul. 26, 2017; U.S. Appl. No. 15/069,785", (Jul. 26, 2017).
Amin, S. M., et al., "Toward a Smart Grid: Power Delivery for the 21st Century", *IEEE power & energy magazine*, vol. 3, No. 5, (Sep./Oct. 2005), pp. 34-41.
Angeladas, Emmanouil , "High Voltage Substations Overview (part 1)", *Siemens*, (Jan. 24, 2013), pp. 1-8.
Aquino-Lugo, Angel A., "Distributed and Decentralized Control of the Power Grid", *Ph.D. Dissertation, University of Illinois at Urbana-Champaign*, (2010), 172 pp. total.
Dash, P. K., et al., "Digital Protection of Power Transmission Lines in the Presence of Series Connected FACTS Devices", *IEEE Power Engineering Society Winter Meeting*, (2000), pp. 1967-1972.
Divan, D. M., "Nondissipative Switched Networks for High-Power Applications", *Electronics Letters*, vol. 20, No. 7, (Mar. 29, 1984), pp. 277-279.
Funato, Hirohito , et al., "Realization of Negative Inductance Using Variable Active-Passive Reactance (VAPAR)", *IEEE Transactions on Power Electronics*, vol. 12, No. 4, (Jul. 1997), pp. 589-596.
Gyugyi, Laszlo , et al., "Status Synchronous Series Compensator: A Solid-State Approach to the Series Compensation of Transmission Lines", *IEEE Transactions on Power Delivery*, vol. 12, No. 1, (Jan. 1997), pp. 406-417.
Gyugyi, Laszlo , et al., "The Interline Power Flow Controller Concept: A New Approach to Power Flow Management in Transmission Systems", *IEEE Transactions on Power Delivery*, vol. 14, No. 3, (Jul. 1999), pp. 1115-1123.
Kavitha, M. , et al., "Integration of FACTS into Energy Storage Systems for Future Power Systems Applications", *International Journal of Advanced Research in Electrical, Electronics and Instrumentation Engineering*, vol. 2, Issue 2, (Feb. 2013), pp. 800-810.

Kumbhar, Mahesh M., et al., "Smart Grid: Advanced Electricity Distribution Network", *IOSR Journal of Engineering (IOSRJEN)*, vol. 2, Issue 6, (Jun. 2012), pp. 23-29.
Lambert, Frank C., "Power Flow Control", *ISGT Europe*, 2014, Istanbul, Turkey, (Oct. 13, 2014), pp. 1-15.
Lehmkoster, Carsten , "Security Constrained Optimal Power Flow for an Economical Operation of FACTS-Devices in Liberalized Energy Markets", *IEEE Transactions on Power Delivery*, vol. 17, No. 2, (Apr. 2002), pp. 603-608.
Mali, Bhairavanath N., et al., "Performance Study of Transmission Line Ferranti Effect and Fault Simulation Model Using MATLAB", *International Journal of Innovative Research in Electrical, Electronics, Instrumentation and Control Engineering*, vol. 4, Issue 4, (Apr. 2016), pp. 49-52.
Mutale, Joseph , et al., "Transmission Network Reinforcement Versus FACTS: An Economic Assessment", *IEEE Transactions on Power Systems*, vol. 15, No. 3, (Aug. 2000), pp. 961-967.
Ramchurn, Sarvapali D., et al., "Putting the 'Smarts' into the Smart Grid: A Grand Challenge for Artificial Intelligence", *Communications of the ACM*, vol. 55, No. 4, (Apr. 2012), pp. 86-97.
Reddy, D. M., et al., "FACTS Controllers Implementation in Energy Storage Systems for Advanced Power Electronic Applications—A Solution", *American Journal of Sustainable Cities and Society*, Issue 2, vol. 1, (Jan. 2013), pp. 36-63.
Renz, B. A., et al., "AEP Unified Power Flow Controller Performance", *IEEE Transactions on Power Delivery*, vol. 14, No. 4, (Oct. 1999), pp. 1374-1381.
Ribeiro, P. , et al., "Energy Storage Systems", Chapters 1-2.4 of Section entitled "Energy Storage Systems" in Electrical Engineering— vol. III, edited by Kit Po Wong, Encyclopedia of Life Support Systems (EOLSS) Publications, (Dec. 13, 2009), 11 pp. total.
Schauder, C. D., et al., "Operation of the Unified Power Flow Controller (UPFC) Under Practical Constraints", *IEEE Transactions on Power Delivery*, vol. 13, No. 2, (Apr. 1998), pp. 630-639.
Siemens SAS, "Portable Power Solutions, "Plug and play" High Voltage E-Houses, skids and mobile high voltage substations up to 420 kV", (Nov. 2015), 8 pp. total.
Swain, S. C., et al., "Design of Static Synchronous Series Compensator Based Damping Controller Employing Real Coded Genetic Algorithm", *International Journal of Electrical, Computer, Energetic, Electronic and Communication Engineering*, vol. 5, No. 3, (2011), pp. 399-407.
Xue, Yiyan , et al., "Charging Current in Long Lines and High-Voltage Cables—Protection Application Considerations", *67th Annual Georgia Tech Protective Relaying Conference*, Atlanta, Georgia, (May 8-10, 2013), pp. 1-17.
"International Search Report and Written Opinion of the International Searching Authority dated Feb. 2, 2017; International Application No. PCT/US2016/062358", (Feb. 2, 2017).
"International Search Report and Written Opinion of the International Searching Authority dated Feb. 2, 2017; International Application No. PCT/US2016/062620", (Feb. 2, 2017).
"International Search Report and Written Opinion of the International Searching Authority dated Mar. 2, 2017; International Application No. PCT/US2016/061009", (Mar. 2, 2017).
"Invitation of the International Searching Authority to Pay Additional Fees dated Dec. 15, 2016; International Application No. PCT/US2016/061009", (Dec. 15, 2016).
"Notice of Allowance dated Feb. 22, 2018; U.S. Appl. No. 15/069,785", Feb. 22, 2018.
"Office Action dated Apr. 6, 2018; U.S. Appl. No. 15/055,422", Apr. 6, 2018.
"Office Action dated Apr. 6, 2018; U.S. Appl. No. 15/157,726", Apr. 6, 2018.
"Office Action dated Jul. 27, 2018; U.S. Appl. No. 15/055,422", Jul. 27, 2018.
Albasri, Fadhel A. et al., "Performance Comparison of Distance Protection Schemes for Shung-FACTS Compensated Transmission Lines", IEEE Transactions on Power Delivery, vol. 22, No. 4, Oct. 2007, pp. 2116-2125.
Bhaskar, M. A. et al., "Impact of FACTS devices on distance protection in Transmission System", 2014 IEEE National Confer- (56) References Cited

OTHER PUBLICATIONS ence on Emerging Trends in New & Renewable Energy Sources and Energy Management (NCET NRES EM), Dec. 16, 2014, pp. 52-58.

Samantaray, S. R., "A Data-Mining Model for Protection of FACTS-Based Transmission Line", IEEE Transactions on Power Delivery, vol. 28, No. 2, Apr. 2013, pp. 612-618.

"Notice of Allowance dated Sep. 24, 2018; U.S. Appl. No. 15/157,726", Sep. 24, 2018.

"Office Action dated Oct. 4, 2018; U.S. Appl. No. 15/975,373", Oct. 4, 2018.

\* cited by examiner

203 – distributed capacitance
204 – distributed resistance
205 – distributed inductance
206 – voltage sending source
207 – voltage receiving source

DISTRIBUTED IMPEDANCE INJECTION MODULE FOR MITIGATION OF THE FERRANTI EFFECT

CROSS-REFERENCE TO RELATED APPLICATIONS

This application is a continuation-in-part of U.S. patent application Ser. No. 15/055,422 filed Feb. 26, 2016, which claims the benefit of U.S. Provisional Patent Application No. 62/264,739 filed Dec. 8, 2015, and is a continuation-in-part of U.S. patent application Ser. No. 15/069,785 filed Mar. 14, 2016, which claims the benefit of U.S. Provisional Application No. 62/264,744 filed Dec. 8, 2015, and this application also claims the benefit of U.S. Provisional Patent Application No. 62/359,885 filed Jul. 8, 2016.

BACKGROUND OF THE INVENTION

1. Field of the Invention

The present invention relates to systems and methods for distributed control of the inductive and capacitive loading of high voltage power transmission lines by using online injection modules that hang on or are connected to the power lines and are enabled for line balancing and distributed control.

2. Prior Art

Figure 1:
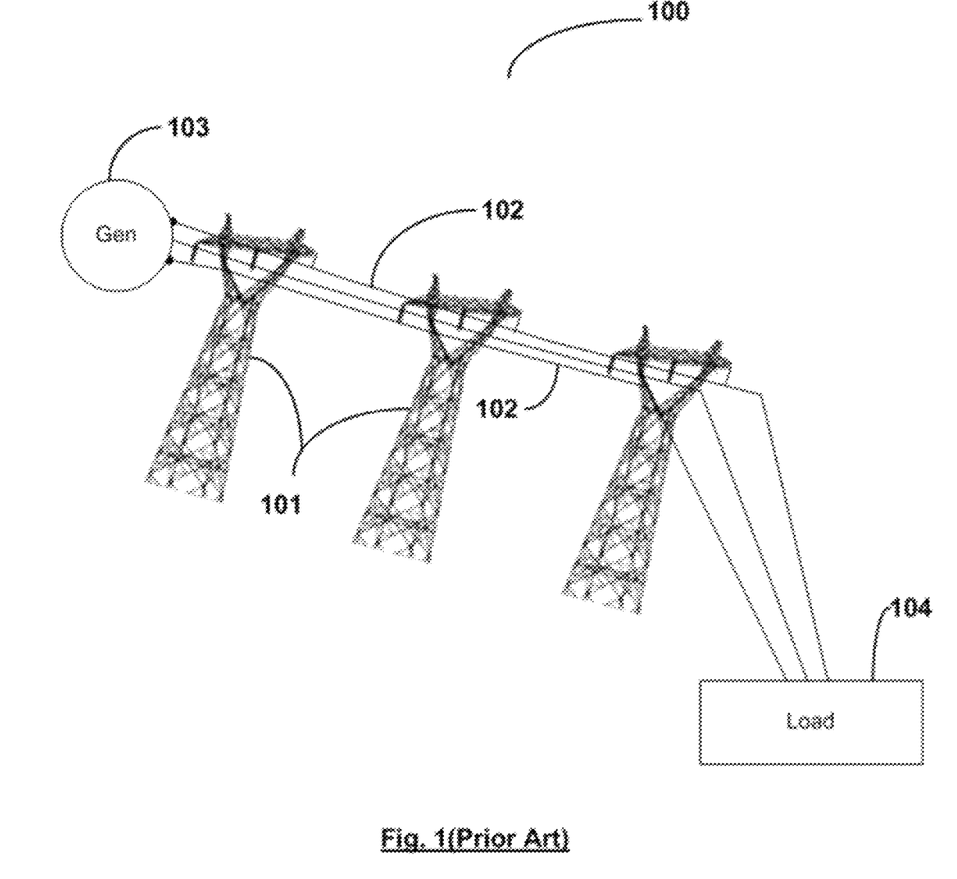
FIG. 1 is a block diagram of the transmission line as per the prior art.

Long transmission lines 102 of the power transmission system 100 shown in FIG. 1 are hung from transmission towers 101 and are used to transfer power, schematically shown as transferring power from generator 103 to load 104. These transmission lines, if long, can have a considerable shunt capacitance and series inductance, together with the transmission line resistance, which are distributed along the entire length of the line. Under these conditions, when the receiving-end power load is very small, or the circuit is open, the voltage at the receiving-end of the transmission line can rise to a level substantially higher than the voltage at the supply-end of the transmission line.

Figure 2:
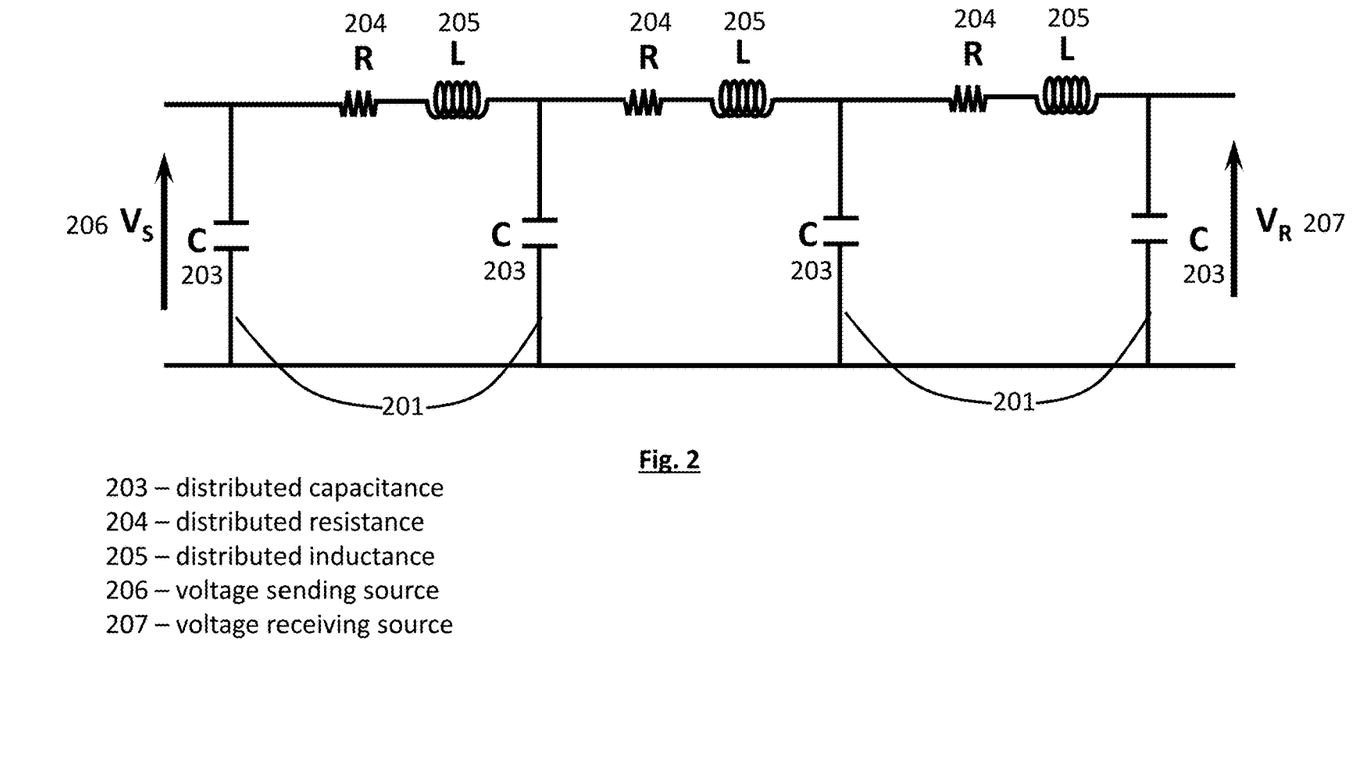
FIG. 2 is a schematic representation of the (distributed π-model) equivalent circuit of the transmission line of FIG. 1 showing the distributed nature of the resistance, inductance, and capacitance associated with the transmission line.

The foregoing effect is referred to as the Ferranti effect, and is caused by the combined effects of the distributed shunt capacitance and series inductance giving rise to a charging current in the transmission line. In particular, the transmission line 102 of FIG. 1 can be represented by the distributed π-model 200 shown in FIG. 2. FIG. 2 illustrates the power line with distributed resistance R 204 and inductance L 205 per unit length segment 201. Capacitance C 203 represents a shunt capacitance between the neighboring lines and ground.

Figure 3:
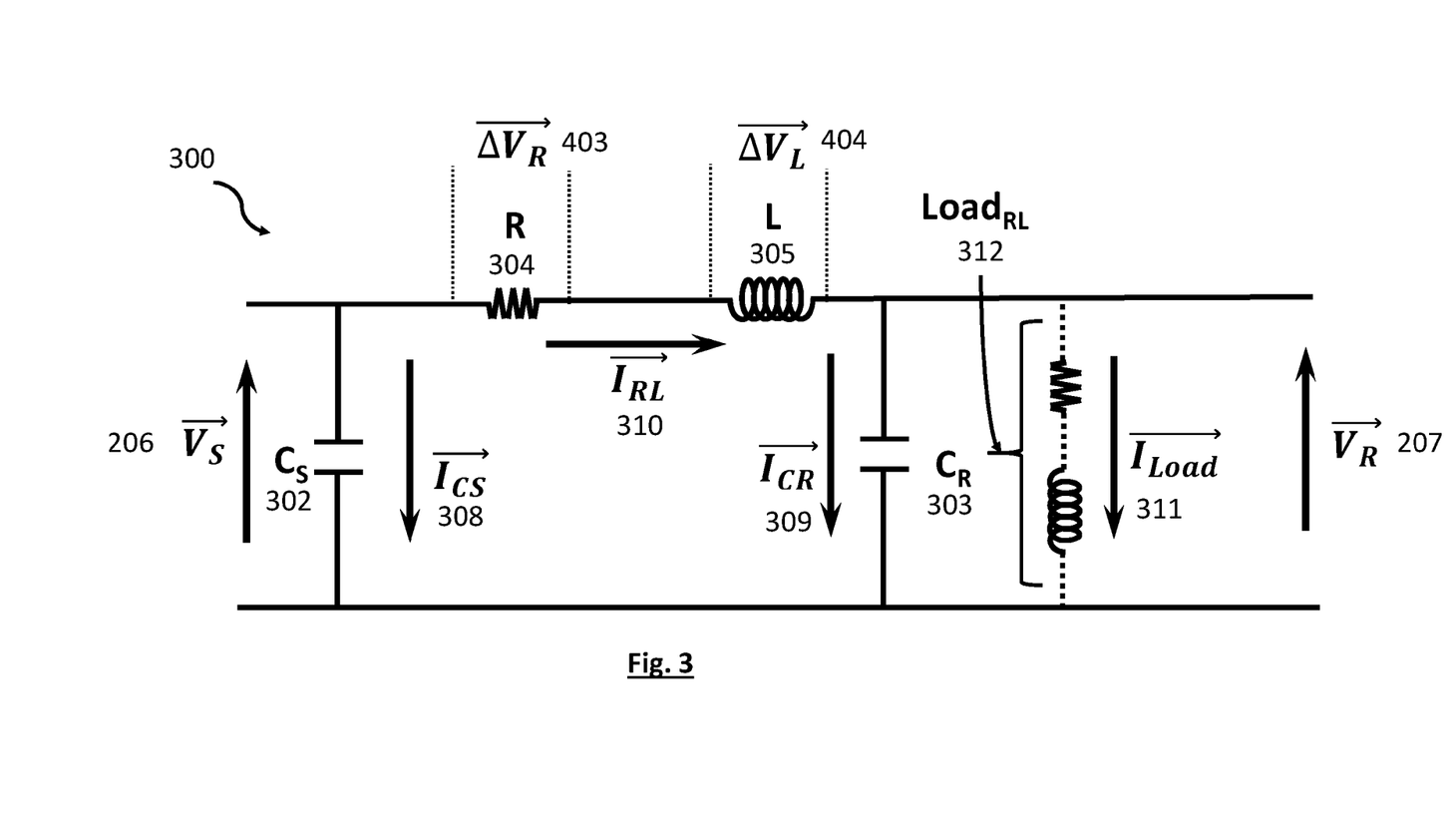
FIG. 3 is a schematic representation of the lumped constant (π-model) equivalent circuit of the transmission line of FIGS. 1 and 2.

Consider the lumped model of FIG. 3 which illustrates a lumped RLC circuit 300 representation of the distributed model 200 of the high voltage transmission line. FIG. 3 is a simplified representation of the high voltage transmission line drawing power from the supply side to the receiving side. Supply voltage $\vec{V_R}$ 206 has a shunt capacitance $C_S$ 302 and capacitive supply current $\vec{I_{CS}}$ 308 with ground. Receiving voltage $\vec{V_R}$ 207 has a shunt capacitance $C_R$ 303 and capacitive receiving current $\vec{I_{CR}}$ 309 with ground, in parallel with the Load$_{RL}$ 312 having a load current $\vec{I_{Load}}$ 311.

Figure 4A:
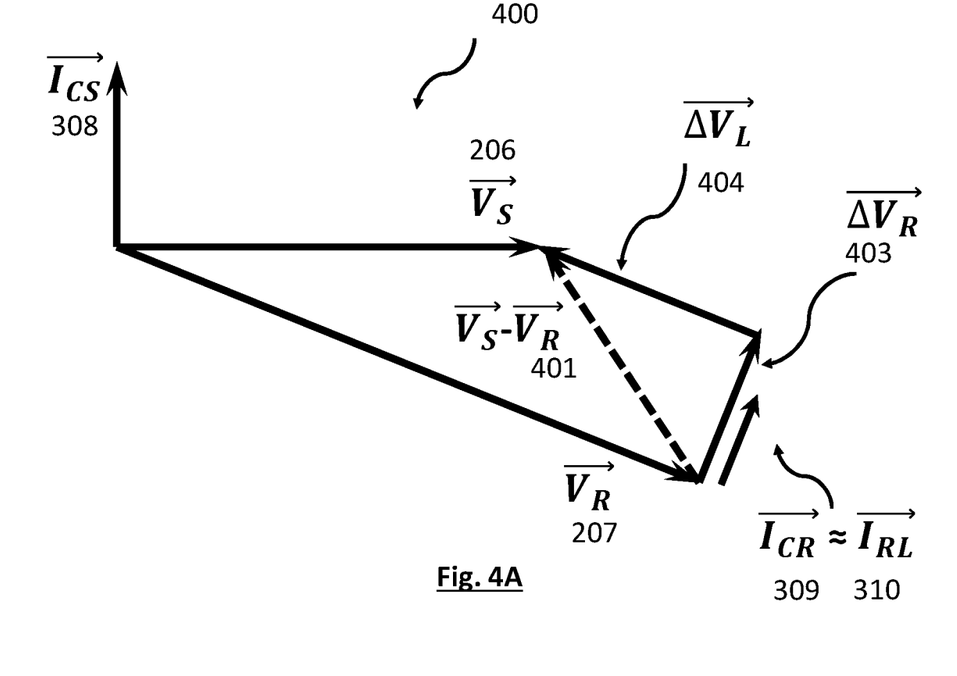
FIG. 4A is a phase diagram of the current-voltage relationships illustrating the Ferranti effect and its cause.

Now consider FIG. 4A, the phase diagram 400, and to most simply illustrate the Ferranti effect, consider the Load$_{RL}$ 312 to be zero, that is the Load$_{RL}$ 312 is open circuited (disconnected) with the load current $\vec{I_{Load}}$ 311 equal to zero, then Vector $\vec{V_R}$ 207 represents the voltage at the receiving end of the transmission line, and appears across the capacitance $C_R$ 303. Because the AC current into a capacitor leads the AC voltage on the capacitor by 90 degrees, the AC current $\vec{I_{CR}}$ 309 in the transmission line leads the voltage on the capacitor $C_R$, namely $\vec{V_R}$ 207, as shown in FIG. 4A. Thus the voltage drop in the line caused by the charging current for capacitor $C_R$ 303, being supplied through the line resistance R 304, is the voltage and $\vec{\Delta V_R}$ 403 across resistor 304, is inphase with the charging current $\vec{I_{CR}}$ 309 as shown. That charging current also passes through the transmission line inductance L 305. Since the AC voltage in an inductor L leads the AC current on an inductor by 90 degrees, the voltage $\vec{\Delta V_L}$ 404 across the inductor L is phase shifted another 90 degrees, as shown in the phase diagram 400. The net result is the voltage $\vec{V_S}$ 206, the voltage at the source end of the transmission line, which as can be seen in FIG. 4A, has a magnitude that is less than the voltage $\vec{V_R}$ 207 at the receiving end of the transmission line.

When the Load$_{RL}$ 312 is not zero, the Ferranti effect does not disappear, but at least for substantial loads, the effects of the capacitive shunt current becomes masked by the dominance of the effects of the load current $\vec{I_{Load}}$ 311, that is the resultant series inductive and resistive drops due the load current $\vec{I_{Load}}$ 311 which is normally much larger than the drops due to the capacitive charging current at no-load conditions. The effects of the shunt capacitor charging current, under these conditions, tends to be lumped with the overall characteristics of the power distribution system for any corrections that may be attempted to maintain voltages, power factors, etc. within desirable limits.

It will be good to have an adaptive solution that can prevent or control the Ferranti effect from increasing the voltage at the receiving end of transmission lines when the load is reduced. What is proposed by the present invention is such a solution implemented using the distributed injection modules, which are also sometimes referred to as active impedance injection modules or distributed voltage/impedance injection modules that have been proposed by the parent applications of the current invention.

BRIEF DESCRIPTION OF THE DRAWINGS

The drawings are made to point out and distinguish the invention from the prior art. The objects, features, and advantages of the invention are detailed in the description taken together with the drawings.

DETAILED DESCRIPTION OF THE PREFERRED EMBODIMENTS

The invention disclosed herein is generally directed at providing a system and method for controlling or limiting the increase in voltage at the load end of a long transmission line by using impedance/voltage injection modules, such as, but not limited to, those disclosed in U.S. Pat. No. 7,105,952.

A plurality of implementations of injection modules has been proposed by the present inventors to allow balancing of the power transferred over a transmission line by changing the line impedance locally. By making these injection modules intelligent, self-aware, and with local intercommunication capability, it is possible to monitor locally and control the power flow over the high-voltage transmission (HV transmission) lines of the power grid. The distributed injection modules are enabled to recognize changes in the power flow characteristics and inject impedances to compensate for the unwanted changes in the high-voltage (HV) transmission lines.

While these injection modules could be directly connected in series with the transmission line with ground connection, this is not normally done because of the need to provide insulation that can sustain high line voltage differences to ground at each module, which will become prohibitively expensive and also make the modules heavy. In practice, the impedance modules are can be electrically and mechanically connected to the transmission line, and are at line potential, or alternatively only magnetically coupled to the transmission line, but in either case, they are enabled to respond to transmission line current variations. These impedance injection modules are ideal candidates for distributed implementation, as existing high voltage power transmission systems can be retrofitted without disturbing the transmission line itself, though alternate implementation of impedance/voltage injection module installations using movable and other support structures are also usable for correcting the Ferranti effect. (The distributed impedance/voltage injection is described in detail as it is the preferred mode for this application). Thus in substantially all cases, the impedance/voltage injection modules respond to transmission line current and not transmission line voltage. Any transmission line corrections that require line voltage information such as corrections in voltage and power factor by each injection module are made by instructions received by wireless, wireline or power line communication to the module based on current measurements made by that module, other communicably linked modules or other line current measurement capability coupled to the high voltage power lines and again communicably linked to the imped-ance/voltage injection modules, and voltage measurements made at the next line voltage measurement facility, typically at the next substation.

As previously described, phase diagram FIG. 4A illustrates the Ferranti effect. As can be seen from that FIG. 4A, the Ferranti effect arises from the AC-charging current in the line inductance L (FIG. 3). Accordingly, injection of a correcting impedance/voltage onto the line can reduce or eliminate this component, leaving the $\overrightarrow{\Delta V_R}$ 403 component, which can be considered a load characteristic and handled as part of a power factor correction.

Figure 4B:
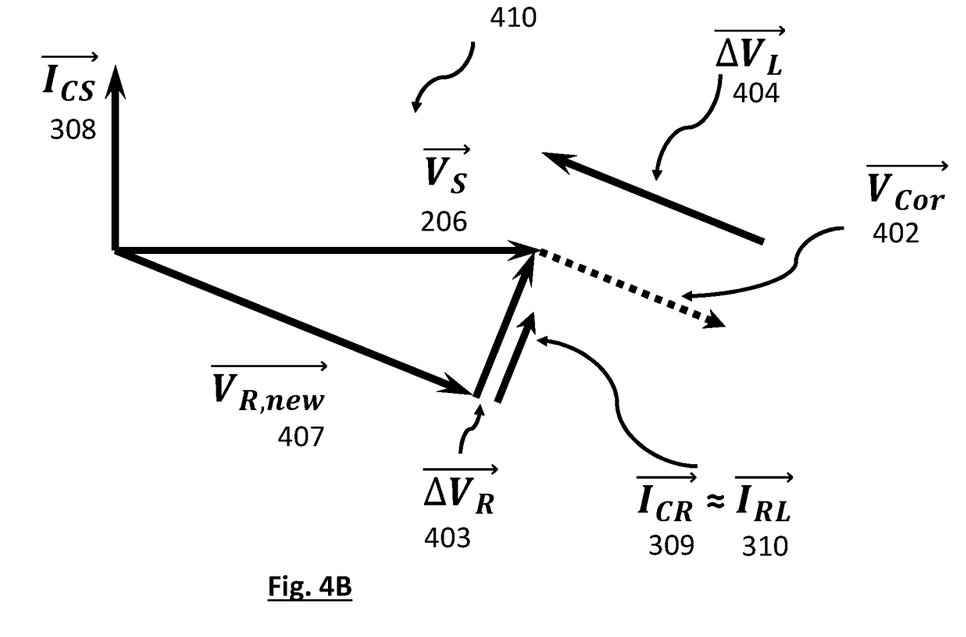
FIG. 4B is a phase diagram 410 of the current-voltage relationship after correction voltage has been applied to mitigate Ferranti effect.

FIG. 4B shows the voltage-current vector relationship 410 with the correction voltage vector $\overrightarrow{V_{Cor}}$ 402 applied to correct the increase in voltage due to Ferranti effect. The resultant voltage vector at the receiver $\overrightarrow{V_{R, new}}$ 407 is the compensated voltage across the capacitor $C_R$ 303 when the Load$_{RL}$ 312 is not present or is very low.

Figure 5:
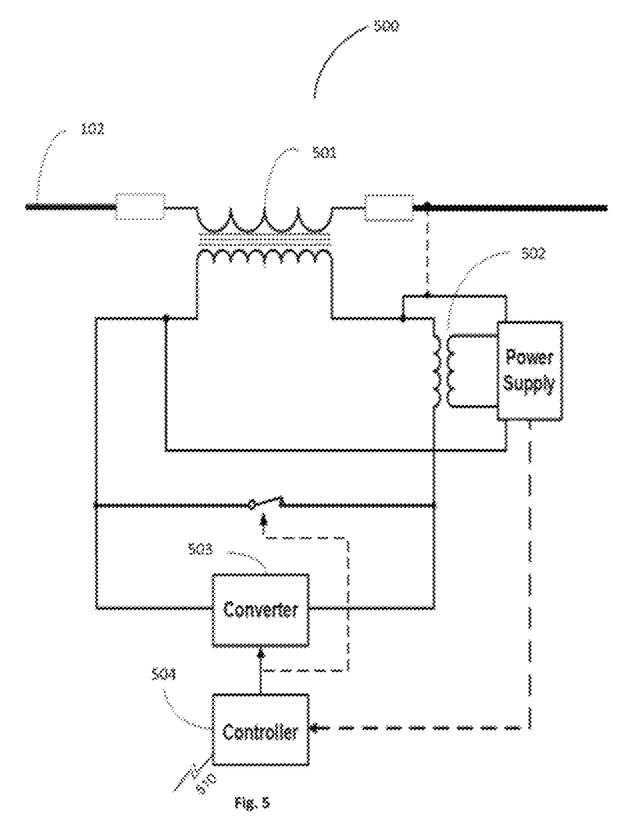
FIG. 5 is a block diagram of a first embodiment of a distributed Voltage/Impedance injection module with a multi-turn primary winding.

FIG. 5 shows an injection module 500 previously disclosed (U.S. patent application Ser. No. 15/055,422) having a transformer 501 with a multi-turn primary winding which is attached to the transmission line by cutting the line and splicing the module in series with the transmission line. The injection module 500 has a controller 504 that senses the changes in current transmitted over the transmission line 102 and voltage information transmitted to the module, and uses them to control the output of a converter 503. Alternatively, the injection module may wirelessly communicate current measurements to the next substation, and the substation, or a separate control station (not shown) wirelessly send specific instructions to the injection module 500 and similar injection modules on the transmission line. The converter 503 generates an impedance (or voltage) that when impressed in a distributed fashion on the transmission line via the transformer 501, can compensate for the changes on the transmission line 102. In this configuration, the module 500 can be electrically connected directly to the power transmission line 102, if desired, and insulated from ground, or allowed to float with respect to the transmission line. The power for the controller is also extracted from the transmission line by a second transformer 502 connected to a power supply module. Any transmission line voltages needed for transmission line control are measured at one or more substations and wirelessly transmitted to the injection modules, or the current measured by the injection modules transmitted to a control location also having the transmission line voltage measurements and the control location transmitting instructions to the injection modules for the desired injection module response.

Figure 6:
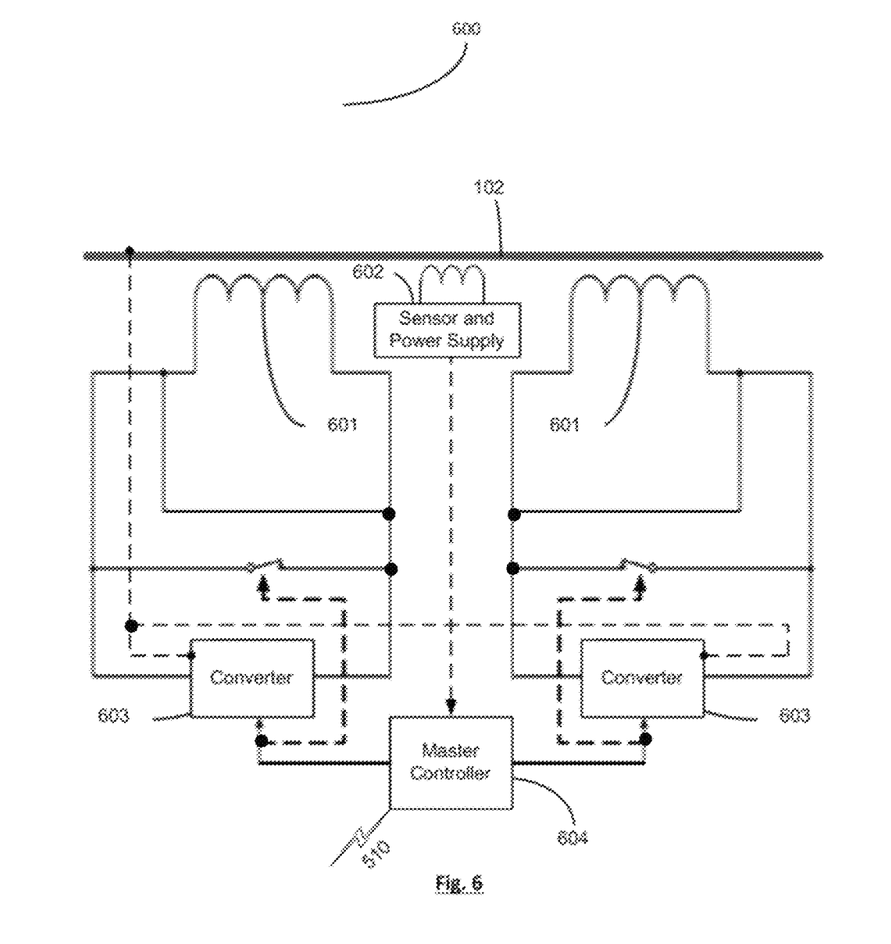
FIG. 6 is a block diagram of a second embodiment of a distributed voltage/impedance injection module having a plurality of single turn primary windings.

FIG. 6 shows a second embodiment of intelligent and self-aware injection module 600 previously disclosed (U.S. patent application Ser. No. 15/069,785) that uses a plurality of single turn primary transformers 601 to couple the output produced by the converters 603 to couple the control voltage to the power line 102. A sensor and power supply module 602 that couples to the power transmission line is used to sense the changes in current in the transmission line 102 and feed it to the controller 604. The controller 604 then provides the necessary instructions to the converters 603 coupled to it. The sensor and power supply module 602 also extracts power from the transmission line to supply to the controller 604 and the other electronic control circuits of the module. This magnetic coupling requires no direct connection to the high voltage transmission line and/or cutting and splicing thereof, and therefore is better suited for a retrofit of existing transmission systems, and even for new installations, should be less costly to implement. The only consideration is the support and insulation for the injection module. In that regard, modules that are only magnetically coupled to the high voltage transmission line are not grounded, but allowed to electrically float with the respect to the transmission line so must be supported using the required insulative characteristics, though usually adequate support and insulation are already available at the support towers, provided the size and weight of the injection modules is appropriately chosen by design.

Figure 7:
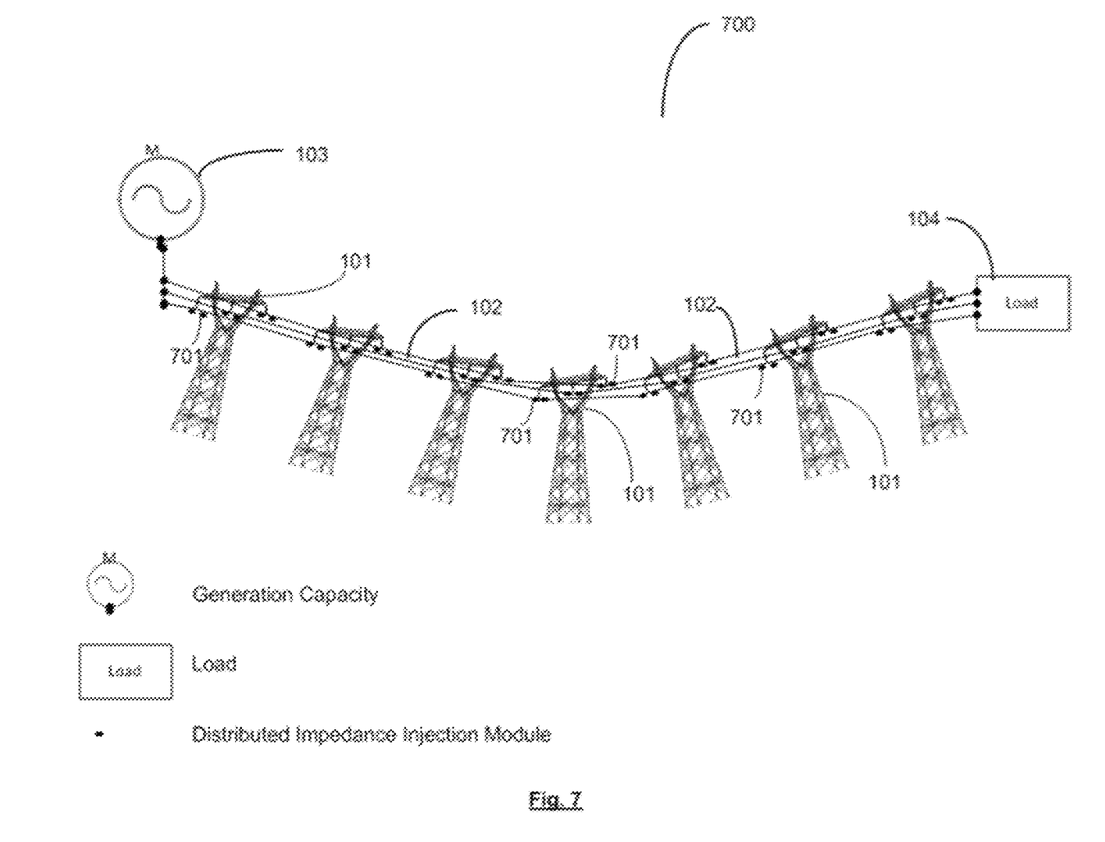
FIG. 7 is a block diagram of the transmission line with distributed voltage/impedance injection modules attached directly to the HV-transmission-lines.

FIG. 7 is a schematic illustration 700 of a long distribution line where the intelligent and self-aware injection modules 701 are distributed over the transmission line 102 at the towers 101 to monitor and control the impedance of the line and provide line balancing and power transfer control capability from the generators 103 to the load 104. These injection modules 701 can also be effectively used to reduce or eliminate the Ferranti effect by injecting a corrective inductance in the high voltage line to reduce or eliminate the $\overrightarrow{\Delta V_L}$ 404 voltage component in FIG. 4A which gives rise to the Ferranti effect. Instead or in addition, a corrective capacitance could be injected by the injection modules 701 which would reduce the transmission line current $\overrightarrow{I_{RL}}$ 310 charging capacitor $C_R$ 303 and thus reduce the current through and hence the voltage $\overrightarrow{\Delta V_L}$ 404 across the inductance L 305 (FIG. 3).

As discussed earlier, concerning the phase diagram 400 in FIG. 4A, the Ferranti effect is produced when the load current on the transmission lines is very low, the load is removed, or the line is open-circuited. These scenarios result in the current of the high voltage transmission line comprising mainly the current in the distributed shunt capacitor of the high voltage transmission line. This capacitive current produces voltage drops in the distributed series inductors L 205 and the distributed resistors R 204 of the high voltage transmission line. The phasor diagram of FIG. 4A illustrates that due to the phase differences introduced by the capacitive current $\overrightarrow{I_{CR}}$ 309 flowing in the line inductance L 305, an additional voltage drop is produced, shown by the phasor $\overrightarrow{\Delta V_L}$ 404. This additional voltage drop is 180 degrees out of phase with the received voltage $V_R$ 207 at the receiving end of the transmission line. This combined with the inphase resistive drop $\overrightarrow{\Delta V_R}$ 403, in the line resistance R 304, produces the resultant Ferranti effect voltage vector $\overrightarrow{V_S}-\overrightarrow{V_R}$ 401 that makes the magnitude of sending end voltage $\overrightarrow{V_S}$ 206 illustrated in FIG. 4A smaller than the magnitude of the voltage at the receiving end $\overrightarrow{V_R}$ 207 of FIG. 4A.

Since the voltage rise is a distributed function that is cumulative over the length of the HV transmission line, it is possible to introduce corrective changes by the preferred method of injecting the correct voltage (impedance) values by the voltage/impedance injection modules distributed over the HV transmission line. Alternately the correction can be applied, as injected voltages to correct the cumulative effect over sections of the high voltage transmission line by using groups of impedance/voltage injection modules, at different points in the line. Both such corrections will be very effective in overcoming the Ferranti effect.

Figure 8:
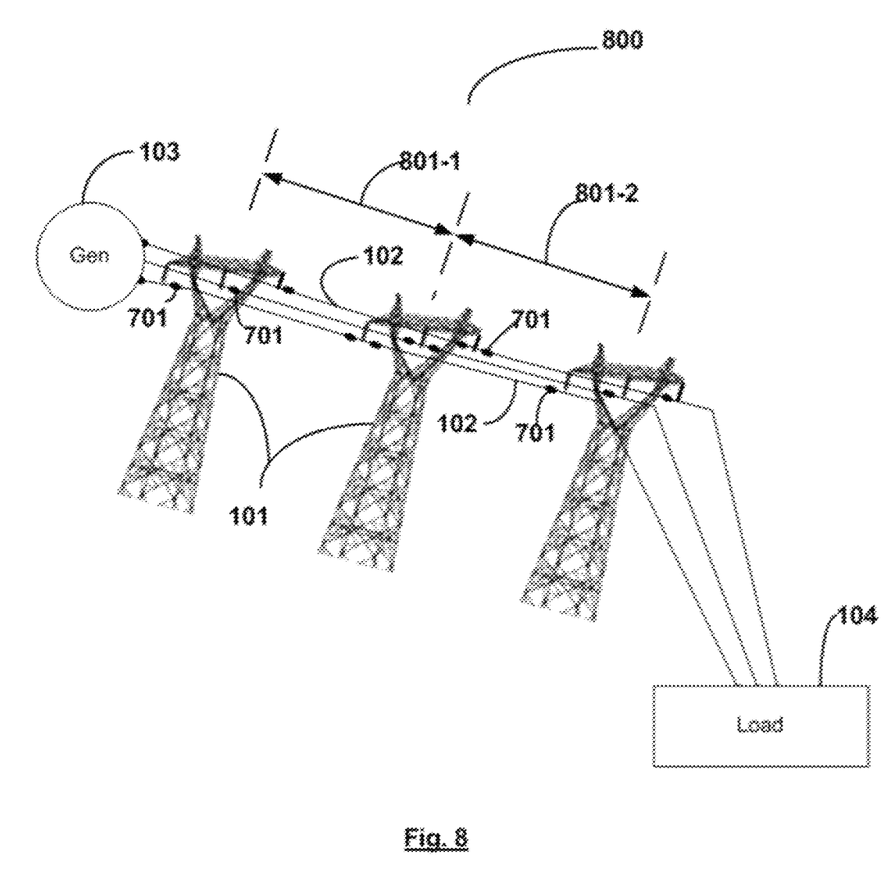
FIG. 8 shows a block diagram representation of a long HV transmission line showing the distributed voltage/impedance injection modules covering each segment of the HV transmission line.

FIG. 8 shows each of the distributed segments 801-1 and 801-2 of the HV transmission line 102. At least one injection module 701 is attached to or suspended from and used to provide a transmission line balancing capability. The distributed segments 801 of the HV transmission line are represented by the distributed impedance diagram 201 of FIG. 2. The injection modules 701 receive wireless control signals from the receiving substation, or from separate localized intelligent centers which themselves receive the needed information from the receiving substation (not shown). Since a long transmission line is involved, the transmission line length may exceed the capabilities of the wireless communication, though the needed control information may easily be sequentially relayed by the injection modules themselves, or by the localized intelligent centers previously referred to. In that regard, note that it is not a disturbance that is being corrected, but a characteristic of the transmission line itself. Consequently, the injection modules themselves, having a transmission line current sensing capability, can be programmed to use a default Ferranti effect correction when they sense the low transmission line current characteristic of an unloaded transmission line, which default correction can then be adjusted for any changes in transmission line characteristics due to weather, etc., based on the actual voltage measurements at the receiving end of the transmission line.

Note also that the Ferranti effect is not a "strong" effect in comparison to other conditions sought to be corrected by the injection modules (line balancing, power factor correction, etc.), but is a cumulative effect of a long transmission line 102. Consequently, the number of injection modules used for overall transmission line control may easily exceed the number needed simply for correction of the Ferranti effect, in which case one might use an equally spaced subset of the available modules for this purpose.

The injection modules are sometimes referred to as impedance/voltage injection modules, as the function of the modules for the present invention is the injection of an effect onto the transmission line with the proper phasing to achieve the desired result, specifically the diminishing or cancellation of the voltage $\overrightarrow{\Delta V_L}$ 404 as shown in FIG. 4B. The injection might be considered an injection of an opposing voltage $\overrightarrow{V_{Cor}}$ 402, or alternatively, the injection of a cancelling inductance, that counteract the line inductance L 305. Any power needed for the injection itself is also taken from the transmission line prior to the injection through the magnetic coupling from and to the transmission line.

Even though the invention disclosed is described using specific implementations, circuits, and components, it is intended only to be exemplary and non-limiting. The practitioners of the art will be able to understand and modify the same based on new innovations and concepts, as they are made available. The invention is intended to encompass these modifications.

What is claimed is:

1. A method of reducing or eliminating a Ferranti effect in a high voltage transmission line comprising:
   coupling impedance/voltage injection modules to the high voltage transmission line
   at spaced apart locations along the high voltage transmission line, the impedance/voltage injection modules each being powered from the high voltage transmission line and having a high voltage transmission line current sensing capability, an impedance/voltage injection capability and a communication capability; and
   using at least a subset of the impedance/voltage injection modules, sensing current in the high voltage transmission line; and when the high voltage transmission line current indicates that a high voltage transmission line load at a receiving end of the high voltage transmission line is low or zero, injecting an impedance/voltage onto the high voltage transmission line at spaced apart locations along the high voltage transmission line to collectively reduce or cancel a voltage generated by a current charging a line capacitance passing through a line impedance.

2. The method of claim 1 wherein all impedance/voltage injection modules are used to inject the impedance/voltage onto the high voltage transmission line to reduce or cancel the voltage generated by the current charging the line capacitance passing through the line impedance when the high voltage transmission line current indicates that the high voltage transmission line load at a receiving end of the transmission line is low or zero.

3. The method of claim 1 wherein the at least a subset of the impedance/voltage injection modules sense the current in the high voltage transmission line and automatically inject the impedance/voltage onto the high voltage transmission line at spaced apart locations along the high voltage transmission line to collectively reduce or cancel the voltage generated by the current charging the line capacitance passing through the line impedance when the current in the high voltage transmission line indicates that the high voltage transmission line load at the receiving end of the high voltage transmission line is low or zero.

4. The method of claim 3 further comprising receiving information relative to the voltage on the high voltage transmission line at the receiving end of the high voltage transmission line and adjusting the injection of an impedance/voltage onto the high voltage transmission line at spaced apart locations along the high voltage transmission line to further control the voltage at the receiving end of the high voltage transmission line.

5. A method of reducing or eliminating a Ferranti effect in a high voltage transmission line comprising:
identifying a low current in the high voltage transmission line using a current sense device within at least a distributed impedance/voltage injection module coupled to the high voltage transmission line;
determining an increase in line voltage, due to the Ferranti effect, at a load or substation end due to the low current in the high voltage transmission line;
injecting a voltage using at least a selected number of distributed impedance/voltage injection modules to compensate for the increase in line voltage at the load or substation end;
thereby correcting the Ferranti effect on the high voltage transmission line.

6. The method of claim 5, wherein the distributed impedance/voltage injection modules are powered from a power drawn from the high voltage transmission line.

7. The method of claim 5, wherein the distributed impedance/voltage injection modules are suspended from the high voltage transmission line and are at a line potential of the transmission line.

8. The method of claim 5, wherein the determined increase in line voltage at the load end of the line due to the Ferranti effect is corrected by a cumulative incremental distributed voltage injection by the distributed impedance/voltage injection modules coupled to the high voltage transmission line.

9. A system for controlling a voltage increase in a high voltage transmission line due to a Ferranti effect, the system comprising:

a plurality of distributed impedance/voltage injection modules coupled to the high voltage transmission line;
a line current sensing circuit associated with each impedance/voltage injection module;
an impedance/voltage injection circuit associated with each impedance/voltage injection module;
a voltage sensing and comparison capability at a load/substation end of the high voltage transmission line; and
a communication channel from the load/substation end of the high voltage transmission line to the distributed impedance/voltage injection modules for transferring information regarding a voltage sensed at the load/substation end of the high voltage transmission line;
wherein when a low current is sensed by the plurality of distributed impedance injection modules and an intimation of over voltage is received over the communication channel, each of the plurality of impedance/voltage injection modules generate and inject an incremental voltage on to the high voltage transmission line in a manner that a cumulative injected voltage from the plurality of impedance/voltage injection modules is sufficient to reduce or overcome the increase in voltage due to the Ferranti effect at the load/substation end of the high voltage transmission line.

10. The system of claim 9, wherein a voltage correction is by equal distributed incremental voltage by each of the plurality of impedance/voltage injection modules.

11. The method of claim 1, wherein the communication capability is any one of a wireless communication capability, a wire line communication capability or a power line communication capability.

12. A method of reducing or eliminating a Ferranti effect in a high voltage transmission line comprising:
coupling a plurality of impedance/voltage injection modules to the high voltage transmission line, the impedance/voltage injection modules each being powered from the high voltage transmission line and having an impedance/voltage injection capability and a communication capability; and
using at least a current sensing capability available on the high voltage transmission line, sensing a current in the high voltage transmission line; and
when the high voltage transmission line current indicates that a high voltage transmission line load at a receiving end of the high voltage transmission line is low or zero, injecting an impedance/voltage onto the high voltage transmission line using the impedance/voltage injection modules to collectively reduce or cancel a voltage generated by a current charging a line capacitance passing through a line impedance.

13. A system for controlling a voltage increase in a high voltage transmission line due to a Ferranti effect, the system comprising:
a plurality of distributed impedance/voltage injection modules coupled to the high voltage transmission line;
a line current sensing capability coupled to the high voltage transmission line and communicably linked to the impedance/voltage injection modules;
a voltage sensing and comparison capability at a load/substation end of the high voltage transmission line; and
a communication channel from the load/substation end of the high voltage transmission line to the distributed impedance/voltage injection modules for transferring information regarding a voltage sensed at the load/substation end of the high voltage transmission line;

wherein when a low current is sensed by the line current sensing capability and an intimation of over voltage is received over the communication channel, each of a subset of the plurality of impedance/voltage injection modules generate and inject an incremental voltage on to the high voltage transmission line in a manner that a cumulative injected voltage from the plurality of impedance/voltage injection modules is sufficient to reduce or overcome the increase in voltage due to the Ferranti effect at the load/substation end of the high voltage transmission line.

\* \* \* \* \*